July 6, 1937.  E. S. GROVES  2,085,853
ELECTRODE HOLDER
Filed April 4, 1936
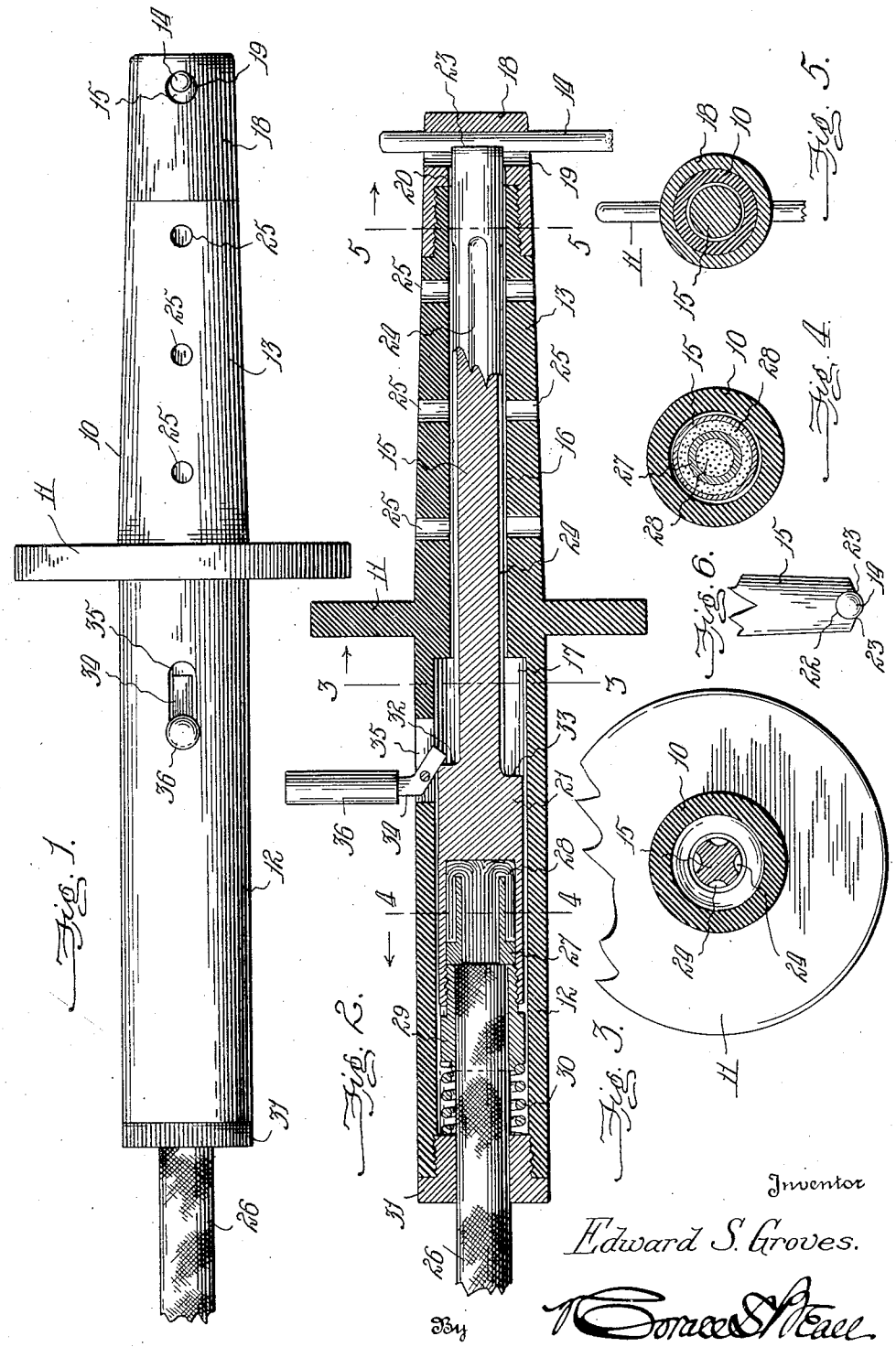
Inventor
Edward S. Groves.

Patented July 6, 1937

2,085,853

UNITED STATES PATENT OFFICE 2,085,853

ELECTRODE HOLDER

Edward S. Groves, Lorraine, N. Y.

Application April 4, 1936, Serial No. 72,791

2 Claims. (Cl. 219—8)

My invention relates to electric welding apparatus, and has particular reference to the holder for manipulating the electrode or welding rod by which heat is applied to the metals to be welded together.

In carrying out the process of electric welding it is important that the holder for the electrode or welding rod protect the operator from the electric current conducted to the welding rod through the holder, and it is also important that the intermediate connections between the conductor-cable and electrode or rod provide against interruption of the current by insecure connections, thus minimizing the heating of the cooperating parts of the holder to protect them against burning out as well as provide that the handle portion of the holder can be comfortably held by the operator.

In the construction of electrode holders of the general class to which my invention relates the electrode or welding rod extending through a transverse opening in the outer end of the tubular holder is held in place by a plunger rod to the rear end of which the conductor-cable is attached, and in some instances the plunger rod is spring-actuated to normally engage the welding rod.

The main purpose of my invention therefore is to provide an improved construction of holder that will be simple and inexpensive in construction, effective in its purpose of securely holding the welding rod for manipulation in the operation of welding, and which will supply the electric current without overheating the holder, all as hereinafter fully described and specifically set forth in the claims.

In the drawing, forming a part of this specification,

Figure 1 is a plan view of an electrode holder constructed in accordance with my invention.

Fig. 2 is a longitudinal vertical sectional view through the holder.

Fig. 3 is a transverse sectional view on the line 3—3 of Fig. 2.

Figs. 4 and 5 are transverse sectional views on the lines 4—4 and 5—5 of Fig. 2, and Fig. 6 is a detail view of the outer end of the plunger rod.

In the construction of my improved form of holder, usable in connection with electric welding apparatus, I employ a tubular casing 10, of suitable insulating material, shaped or molded to include an annular guard 11 separating a handle portion 12 from the tapered forward end portion 13 of the holder in the outer end of which the electrode or welding rod 14 is securely held by a plunger rod 15 working in a differential bore 16, 17, extending through the casing from one end to the other thereof. The larger portion of the bore which extends from the rear end of the casing terminates a short distance in the rear of the hand guard 11, while the narrower portion, 16, opens out at the forward end of the casing, and upon this forward end is threaded a cap 18 with a transverse opening 19 through its thickened portion or head to receive the electrode or welding rod. The thickened portion of the cap is also provided with an opening 20 communicating with the aforementioned opening and is a continuation of the bore 16 in the casing for the operation of the plunger rod, it being understood that the cap is removable for the purpose of replacement when desired.

The plunger rod is provided with an enlarged portion, 21, working in the bore 17 of the casing, and when this plunger rod is in association with the casing the outer end thereof projects through the opening 20 in the cap 18 to engage the welding rod or electrode which extends through the transverse opening 19. The plunger rod is spring-actuated, as hereinafter described, to grip the welding rod for holding it firmly in place within the outer end of the holder, and to insure a proper electrical contact with the welding rod the outer end of said plunger rod is grooved to partly embrace the welding rod, as shown in the fragmental view, Fig. 6, by which the groove, 22, presents opposite edges 23, 23, that bite into the electrode or welding rod or scrape the surface thereof to brighten the points of contact. By reference to the drawing it will be noted also that the opening 19 through which the welding rod passes is of larger diameter than the rod for the circulation of air to minimize the heating of the parts at this point, and for a similar purpose—to minimize the heating of the casing or internal parts of the holder—said plunger rod being provided with longitudinal grooves 24 cooperating with air holes 25 through the forward portion of the casing.

For connecting the electric cable 26 to the plunger rod conducting the current to the welding rod or electrode the rear end of the enlarged portion of the plunger rod is recessed to receive said cable, the connections in the present instance comprising a sleeve or bushing 27 fitting tightly over the wires 28 from which the insulation has been removed, in association with a nipple 29 fitting tightly over the insulated end portion of the cable and threaded into the rear end of the plunger rod, it being noted that the sleeve that fits over the exposed wires bears against the end of the nipple and insulated end of the cable, and that as the plunger rod is of the spring-actuated type a spring 30 is interposed between the outer end of the nipple and a bushing 31 threaded into the rear end of the casing. The bushing 31 and nipple 29, either one or both, may be of insulating material to prevent the electric current from passing from the wires of the conducting cable to the bushing at the end of the handle portion of the casing, and in order to maintain a positive connection between the electric cable and plunger rod the sleeve 27 is reduced in diameter for a considerable portion of its length so that the bared wires will be mushroomed against the inner end of the recess in the plunger rod and the extremities of said wires clamped between the reduced portion of the sleeve and inner wall of the recess, for it is at this point or joint that the electric connection between the cable and plunger rod should be secure and intimate for maintaining proper contact in conducting the electric current.

When the parts thus far described are assembled there is a space left between the inner end of the bore 16 and shoulders 32, 33, at the inner end of the enlarged portion of the plunger rod for the engagement of a bent lever 34 employed for retracting the spring-actuated plunger rod to release the welding rod, said bent lever being pivoted in a slot 35 in the casing in the rear of the guard 11 and the operator protected from electric shock by means of a handle 36 of insulating material. As it is usually required to burnish the outer end of the plunger rod from time to time, in order to establish a good contact with the welding rod, the shoulders 32, 33, at the forward end of the enlarged portion of the plunger rod, are located one in advance of the other so that the reduction in the length of the plunger rod will not affect the operation of the releasing lever 34, it being necessary in this instance to merely turn the plunger rod for engagement of the lever with the other shoulder.

The utility of my improved construction of electrode holder will be readily understood from the foregoing description in connection with the drawing, for in use the guard will protect the hand of the operator during the manipulation of the welding rod in accomplishing the welding of the metals, and as the electric connection between the cable and plunger rod provides extraordinary surface contacts for conducting the electric current from the wires of the cable to the plunger rod, this contact in addition to the contact between the outer end of the plunger rod and welding rod increases the effectiveness of the device. Furthermore, by providing the plunger with the longitudinal grooves cooperating with the holes in the casing the heating of the holder is reduced to a considerable extent.

In replacing a welding rod it is necessary only to retract the spring-actuated plunger by means of the lever which bears against the shoulder formed by enlarging the rear end portion of the plunger rod, and as the outer end of the holder is subjected to considerable heat during the operation of welding, causing depreciation of the same, the provision of a removable cap presents a convenient means for repairing the holder by simply substituting a new cap.

I claim:—

1. An electrode holder comprising a tubular casing, a cap threaded on the outer end of the casing and having a transverse opening at its outer end to receive the electrode or welding rod and an opening communicating with said transverse opening at the inner side thereof, said casing having air holes in its forward portion, a spring-actuated plunger rod working within the tubular casing and through the last mentioned opening in the cap to engage the welding rod and having longitudinal grooves cooperating with the air holes in the casing to minimize the heating of the plunger, means for retracting the plunger rod to release the welding rod, and electric connections for attaching a conducting cable to the plunger rod.

2. An electrode holder comprising a tubular casing having a transverse opening at its outer end to receive the electrode or welding rod, said casing having a differential bore extending through the same with the wider portion of the bore at the inner end thereof, holes through the opposite sides of the outer portion of the tubular casing leading into the bore, a spring-actuated plunger rod extending through the bore in the tubular casing, the outer portion of said plunger working in the smaller bore having longitudinal grooves in the sides thereof and the inner portion of larger diameter, working in the inner portion of the bore, providing shoulders spaced from the inner end of the larger bore, and a bent lever pivoted in an opening through the casing to engage the aforesaid shoulders for retracting the plunger; together with means for connecting the electric cable to the end of the plunger.

EDWARD S. GROVES.